United States Patent [19]

Richter, Jr.

[11] 3,891,251
[45] June 24, 1975

[54] SWAGED-TUBE COUPLING
[75] Inventor: Albert P. Richter, Jr., Houston, Tex.
[73] Assignee: Texaco Inc., New York, N.Y.
[22] Filed: Mar. 13, 1974
[21] Appl. No.: 450,912

[52] U.S. Cl.................... 285/338; 285/15; 285/354
[51] Int. Cl............................................. F16l 19/02
[58] Field of Search...... 285/12, 15, 16, 354, 334.1,
285/332, 348, 338, 196, 349, 334.5, 247,
379, 353, 248, 249, 370; 16/108, 109

[56] References Cited
UNITED STATES PATENTS
2,523,578  9/1950  Lewis............................ 285/334.5 X
3,618,987  11/1971  Carbone ................................. 285/12

FOREIGN PATENTS OR APPLICATIONS
267,697  3/1927  United Kingdom................. 285/370
864,491  1/1953  Germany........................... 285/353
807,680  1/1959  United Kingdom.............. 285/334.1

Primary Examiner—Richard J. Scanlan, Jr.
Assistant Examiner—Moshe I. Cohen
Attorney, Agent, or Firm—Thomas H. Whaley; C. G. Ries; Henry C. Dearborn

[57] ABSTRACT

A tube-coupling combination for use in applying a soft seal adapter to a tubing coupler, where a previously swaged ferrule on the tube end is used to act as a stop for the coupling nut. It is especially useful in cases where large temperature changes cause leaks to develop. The adapter permits insertion of an O-ring so that it is axially compressed between the edge of the tube and a flange on the adapter. It makes possible the continuous use of a coupler that had failed.

2 Claims, 3 Drawing Figures

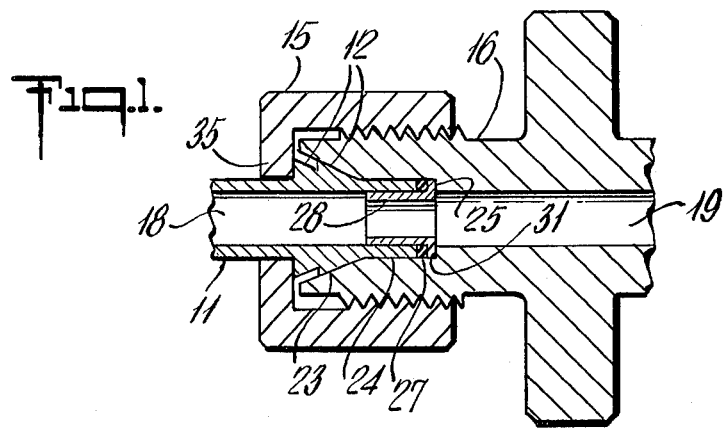
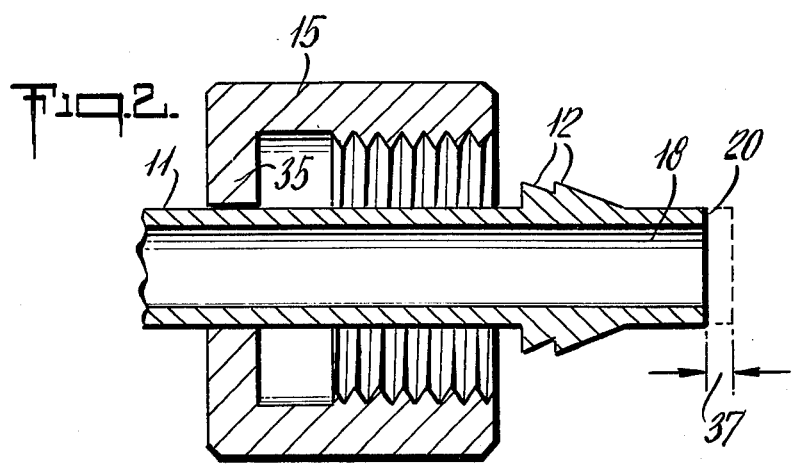
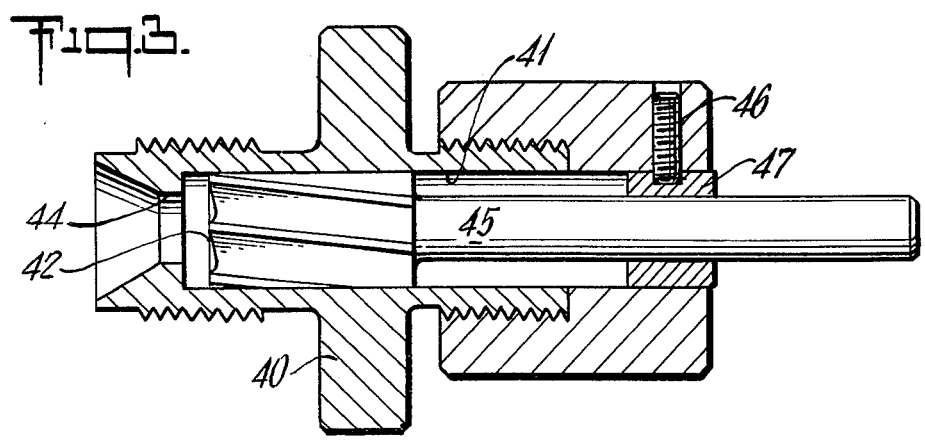

SWAGED-TUBE COUPLING

BACKGROUND OF THE INVENTION

1. Field of the Invention

This invention concerns a coupling for tubing, and more specifically relates to a coupling for use with a swaged-tube structure.

2. Description of the Prior Art

While various couplings for pipes and tubes are known, there has been nothing known which embodies the attributes of this particular coupling structure, which is especially useful with a swaged-tube coupler.

SUMMARY OF THE INVENTION

Briefly, the invention concerns a swaged-tube coupling that includes a coupling nut, and which comprises in combination a tube end having a swaged ferrule thereon. The ferrule comprises a plurality of tapered protrusions that are located circumferentially around the tube, and that have flat radial surfaces placed a predetermined axial distance from the said tube end. The said coupling nut is situated on said tube on the far side of said swaged ferrule from the tube end, and the said nut has an integral flange extending radially inward to form a close fit over said tube and for contacting said ferrule against said flat surfaces.

The coupling also comprises a resilient-material O-ring having an inside diameter equal to the inside diameter of said tube end, and a cylindrical hollow sleeve having an outside diameter less than the inside diameter of said tube end for making a sliding fit therein. The coupling also comprises an integrally formed flange on one end of said sleeve and extending radially outward so that the maximum diameter of said sleeve flange equals the outside diameter of said tube end, and a threaded fitting for cooperating with said nut and having an inside passageway equal to the inside diameter of said tube end. The said threaded fitting has a coaxial bore facing said tube end and forming a radial shoulder for contacting the outside of said sleeve flange. Also, said O-ring is situated radially outside of said sleeve and axially between said tube end and the inside edge of said sleeve flange.

BRIEF DESCRIPTION OF THE DRAWINGS

The foregoing and other objects and benefits of the invention will be more fully set forth below in connection with the best mode contemplated by the inventor of carrying out the invention, and in connection with which there are illustrations provided in the drawings, wherein:

FIG. 1 is a longitudinal cross-section, illustrating a coupling according to the invention;

FIG. 2 is an enlarged longitudinal cross-section, illustrating the tube end and coupling nut with an indication of modification of the tube end for applying an adapter in accordance with the invention; and FIG. 3 is a longitudinal view partly in cross-section, illustrating a special tool which may be employed in modifying the tube end as indicated by the FIG. 2 illustration.

DESCRIPTION OF THE PREFERRED EMBODIMENT

In certain equipment where metal tubing is employed which uses couplings that make use of swaged ferrules near the tube ending, it has been found that particularly where large temperature changes take place, tightening and retightening of the couplings in order to maintain a seal, cause deforming of the ferrules so that a seal cannot be maintained. In such equipment the tube end is often an integral part of the equipment with which it is associated, and consequently it is not possible to renew the fittings by cutting off and reswaging the ends.

In addition to the foregoing, there are many situations where a tube coupling involves the use of a swaged end to act as a stop for the coupling nut. Such arrangements are frequently used where the tube and its coupling act in support of the equipment to which the tube connects. Therefore, along with the temperature-change problems as indicated above, there is mechanical vibration which tends to loosen the coupling and thus creates the need for retightening often and thus to cause the indicated wear against the swaged ferrules, until a tight seal is no longer possible.

Referring to FIG. 1, there is shown in crosssection a combination according to this invention. Thus, there is a tube end 11 which has a plurality of ferrules 12 that have been swaged out from the outside of the tube 11 in a conventional manner. Also, there is a coupling nut 15 that will have been placed onto the tube end 11 prior to swaging of the ferrules 12. This would have to have been the case unless the nut could have been applied over the length of the tube 11 from the other end.

In the type of apparatus to which this invention particularly applies, the tube end 11 is an integral structural part of some equipment (not shown), e.g., a "cold trap" of a type that is used in gas-analysis systems. Consequently, once the ferrules 12 have become worn or deformed too much so that it is no longer possible to maintain a seal as required, the tube end would have to be cut off and reswaged. However, in the case of that type of cold trap it would not be feasible and, therefore, the trap would have to be replaced which involves not only another trap but after replacement, there is from one-half to a whole day of "downtime" after installation to allow the trap to chemically "clean up" and function properly in the system.

The tube-coupling combination also includes a conventional threaded fitting 16 that cooperates with the nut 15 to form a coupling, or joint, between the inner passage 19 and inside 18 of the tube 11.

As indicated above, the changes in temperature and mechanical vibrations applied to the equipment (not shown) that has tube 11 as part thereof, cause loosening at the seal of the coupling joint between the outside of the ferrules 12 of the tube 11 and a conical seat 23. This seat 23 is located at the open end of a bore 24 that has an inside diameter slightly larger than the outside diameter of the tube 11. There is a shoulder 25 at the inside end of the bore 24.

In order to overcome the tendency to loosen and cause leakage at the metallic joint or pressure surfaces between the ferrules 12 of the tube 11 and the seat 23 of the fitting 16, an adapter according to this invention is inserted between the end 20 and the shoulder 25. Of course, some additional clearance must be provided (as will be explained in more detail below) in order to make room for the adapter.

In connection with the adapter, there is inserted a resilient-material O-ring 27 that fits around the outside of a cylindrical hollow sleeve 28. The O-ring 27 is constructed with an inside diameter equal to the inside diameter of the end of tube 11 so that it fits easily over the outside of the sleeve 28.

On one end of the sleeve 28, there is an integrally formed flange 31 that extends radially outward with a maximum diameter slightly less than the inside diameter of the bore 24. Thus, it will be clear that the adapter may be inserted in the end of tube 11 so that the O-ring 27 rests against the edge 20 of the tube 11. Then, as the coupling joint is made up, the fitting 16 will be placed over the end of the tube 11 while the nut 15 is tightened by threaded engagement with the male threads on the fitting 16. This causes a flange 35 on the nut 15 to come in contact with the flat edges of the ferrules 12. Consequently, the fitting 16 will be drawn toward the tube 11 so as to compress the O-ring 27 between the edge of tube 11 and the flange 31. Of course, this takes place because the shoulder 23 of the fitting 16 will be drawn axially against the outside edge of the flange 31.

It will be appreciated that the foregoing combination creates a tight and lasting seal by reason of the resilience of the O-ring 27 that is compressed in the described space. Of course, the space must be created if the relative axial positions of the tube end 11 and the fitting 16 must remain the same (as they were before adding a seal combination according to the invention). Thus, a predetermined amount 37 (see FIG. 2) will be machined off the end of tube 11.

FIG. 3 illustrates a special tool which may be employed in accurately and simply cutting the end of the tube 11 for shortening it to provide the needed extra space as described above. This tool is made up of a conventional fitting 40 (like fitting 16), but which has been bored out from the right-hand end, as viewed in FIG. 3, to have an enlarged axial bore 41 that is slightly larger in diameter than the outside diameter of the tube 11. The bore 41 is preferably extended to sufficient depth for permitting maximum expected end-shortening of the tube 11. However, for a particular operation, the amount to be cut off the end of the tube 11 is set prior to use of the tool. This is done so as to have the axial distance between the outer edges (tip of the tapered surfaces) of the ferrules 12, and the end, or edge 20 of the tube 11, equal to the axial distance as measured from an inner shoulder 44 on the tool (fitting 40) to transverse cutting edges 42 of a milling cutter 45. The distance is maintained, once set, by tightening a set screw 46 onto a collar 47 that surrounds the shank of the cutter 45.

It is a simple matter to mill off the proper amount from the end of the tube 11 by using the special tool. It is done by applying and rotating, as necessary, the milling cutter 45 while in place in the fitting 40. Such cutting action is continued until the shoulder 44 has contacted the tip of the ferrules 12 which stops longitudinal movement of the cutter.

It will be appreciated that the special tool, illustrated and described in FIG. 3, facilitates the adaptation of the tube 11 for applying the combined seal structure in accordance with this invention. Furthermore, such tool may be employed manually or in connection with an electric drill, or the like, depending upon the nature of the tubing 11.

While the invention has been described above in considerable detail and in accordance with the applicable statutes, this is not to be taken as in any way limiting the invention, but merely as being descriptive thereof.

I claim:

1. A swaged-tube coupling including a coupling nut and comprising in combination, a tube end having a swaged ferrule integrally formed on the exterior of said tube end and comprising a plurality of tapered protrusions located circumferentially around the tube end and having a flat radial surface spaced a predetermined axial distance from said end, said coupling nut being situated on said tube end on the far side of said swaged ferrule from said tube end, said nut having an integral flange extending radially inward forming a close fit over said tube end for contacting said ferrule against said flat radial surface, a resilient-material O-ring having an inside diameter equal to the inside diameter of said tube end, a cylindrical hollow sleeve supporting said O-ring and having an outside diameter less than the inside diameter of said tube end making a sliding fit therein, an integrally formed flange on one end of said sleeve and extending outward so that the maximum diameter thereof is equal to the outside diameter of said tube end to accommodate said O-ring between it and said tube end, and a threaded fitting cooperating with said nut and having an inside diameter passageway equal to the inside diameter of said tube end, said threaded fitting having wall means defining a coaxial bore facing said tube end and forming a radial shoulder for contacting the outside of said sleeve flange, said passageway and said bore forming a passageway through said fitting, said O-ring being axially between said tube end and the inside edge of said sleeve flange so that when said nut is tightened, said O-ring is squeezed into sealing engagement with said wall means and said tube end.

2. A swaged-tube coupling including a coupling nut, and comprising in combination, a tube end having a swaged ferrule integrally formed from and located on the exterior thereof providing a stop for said coupling nut, a resilient-material O-ring having an inside diameter equal to the inside diameter of said tube end for sealing said coupling, a threaded fitting cooperating with said nut and having an internal bore with an inside diameter equal to the inside diameter of said tube end providing a coupling with said tube end, said fitting having wall means defining a coaxial bore accommodating said O-ring and said tube end, said fitting internal bore and said wall means forming a passageway through said fitting, a cylindrical hollow sleeve having an outside diameter less than the inside diameter of said tube end making a sliding fit therein and supporting said O-ring thereon, an integrally formed flange on one end of said sleeve, said flange extending radially and having a maximum diameter less than the inside diameter of said wall means defining said coaxial bore making a sliding fit therein, and said coaxial bore forming a transverse radial shoulder contacting said flange and squeezing said O-ring into sealing engagement with said tube end and wall means when said nut has been tightened.

* * * * *